July 23, 1935.  W. F. OCENASEK  2,008,673
POWER DRIVEN TOOL
Filed March 7, 1934  3 Sheets-Sheet 1
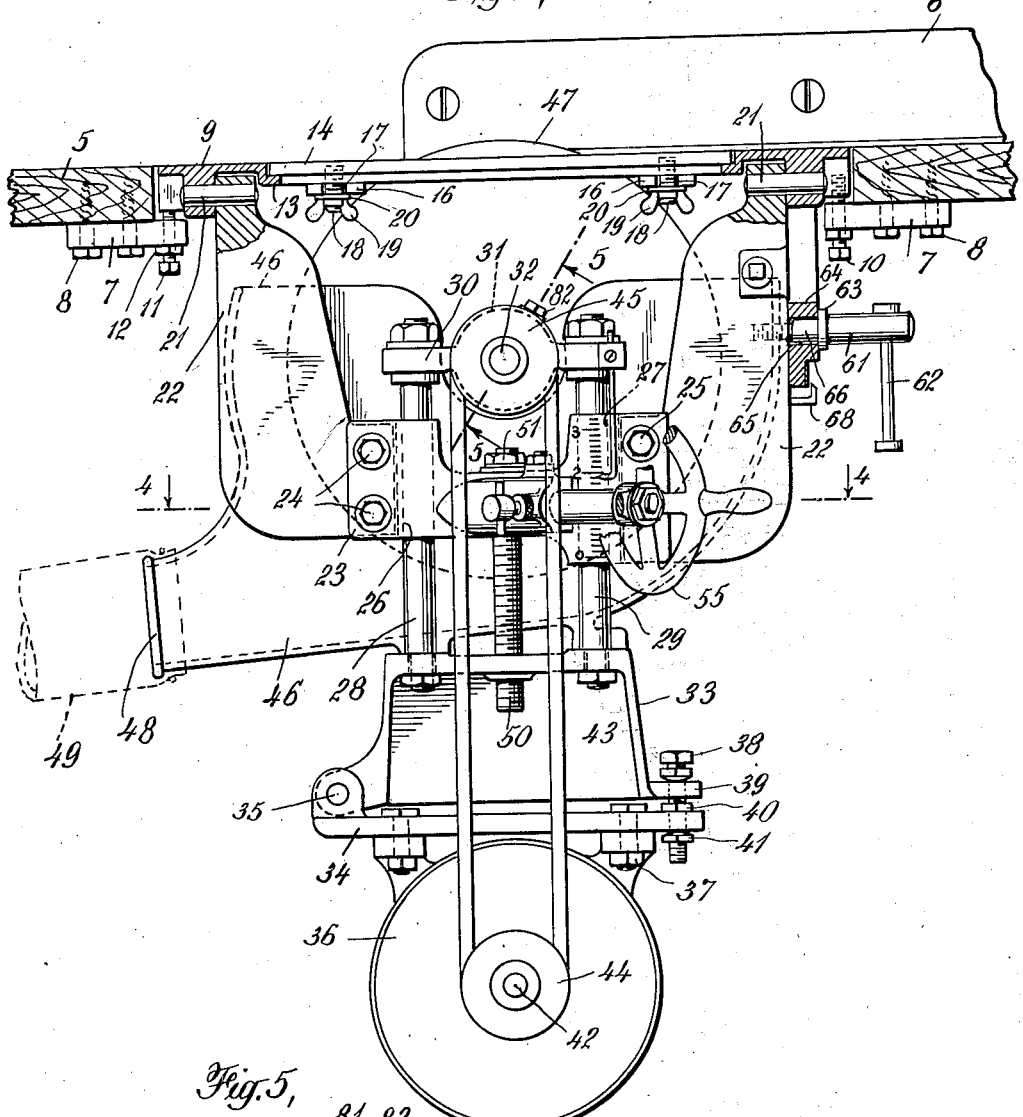
Fig.1,
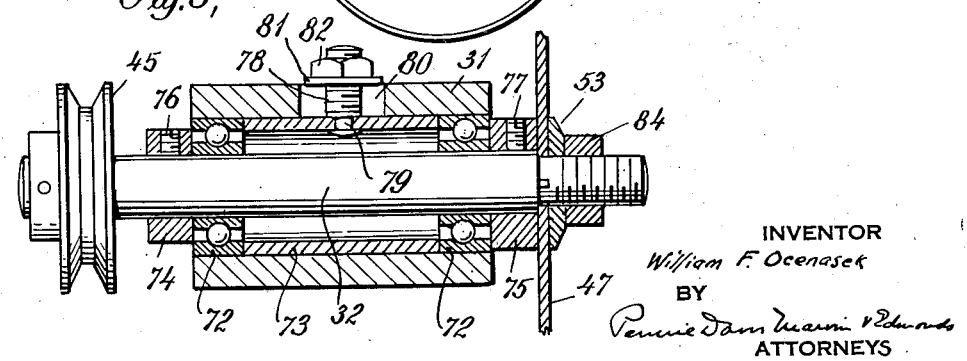
Fig.5,
INVENTOR
William F. Ocenasek
BY
Pennie Davis Marvin & Edmonds
ATTORNEYS July 23, 1935.  W. F. OCENASEK  2,008,673
POWER DRIVEN TOOL
Filed March 7, 1934  3 Sheets-Sheet 2
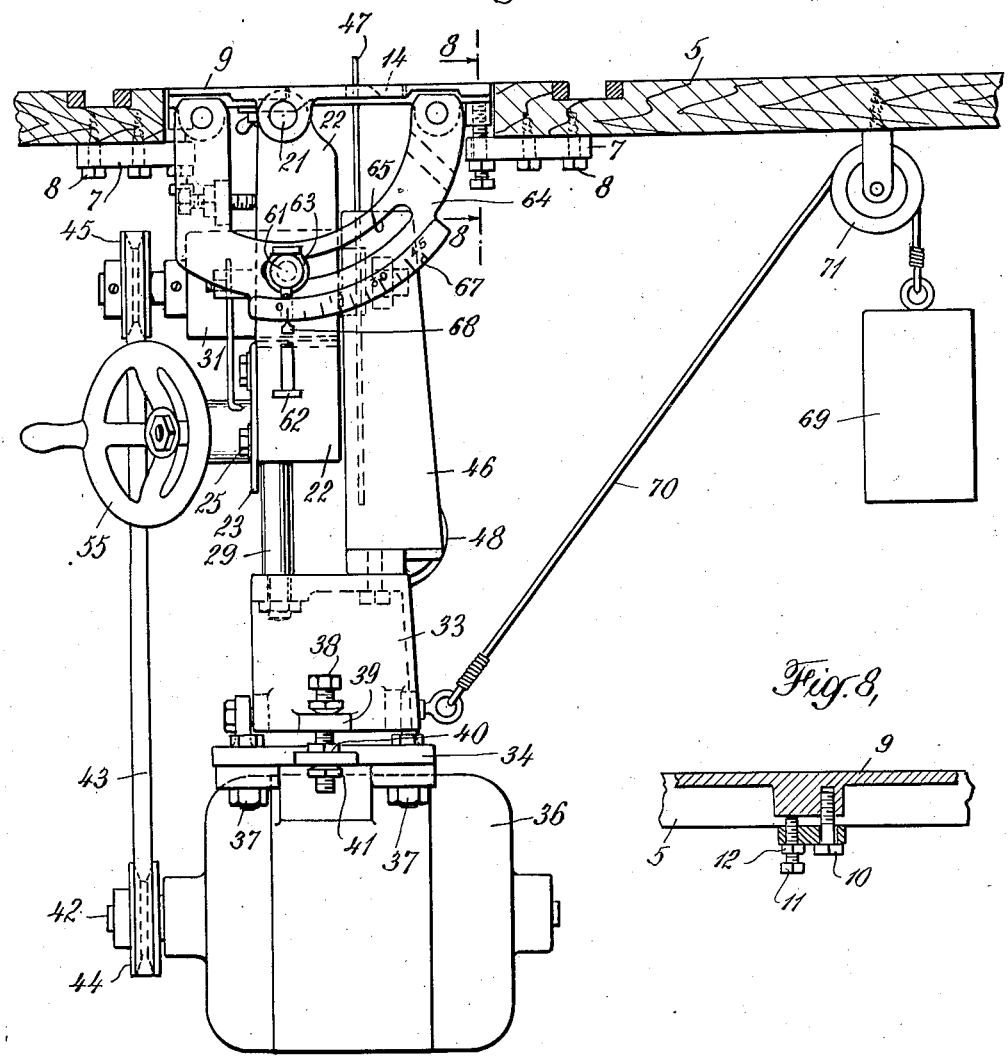
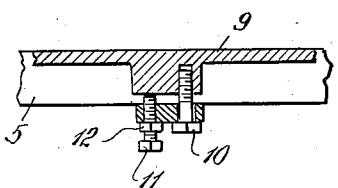
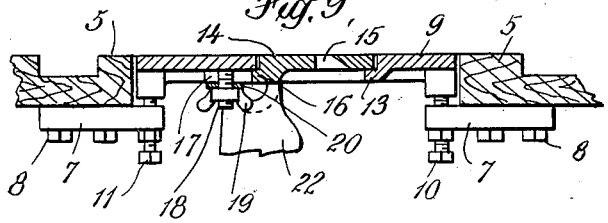
INVENTOR
William F. Ocenasek
BY
ATTORNEYS July 23, 1935.  W. F. OCENASEK  2,008,673
POWER DRIVEN TOOL
Filed March 7, 1934  3 Sheets-Sheet 3
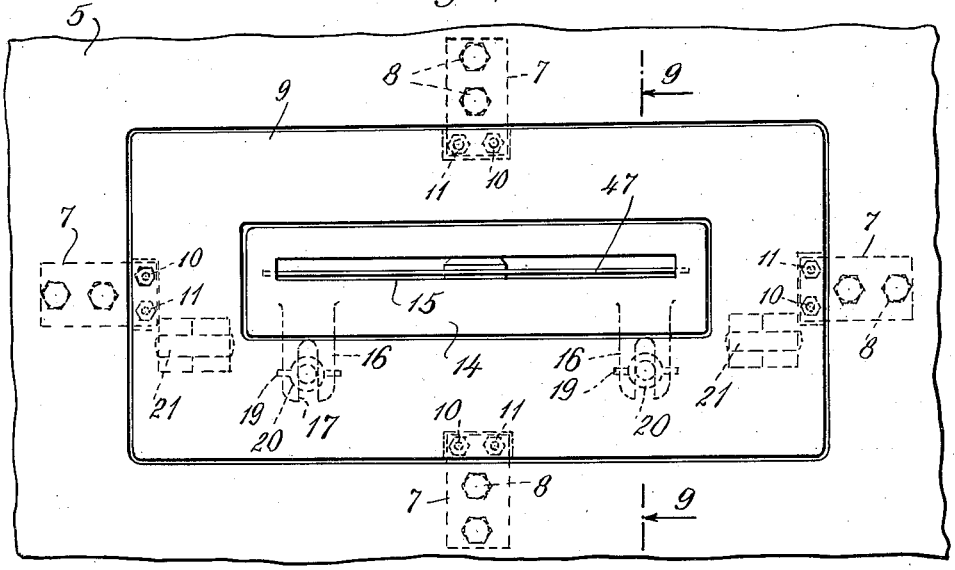
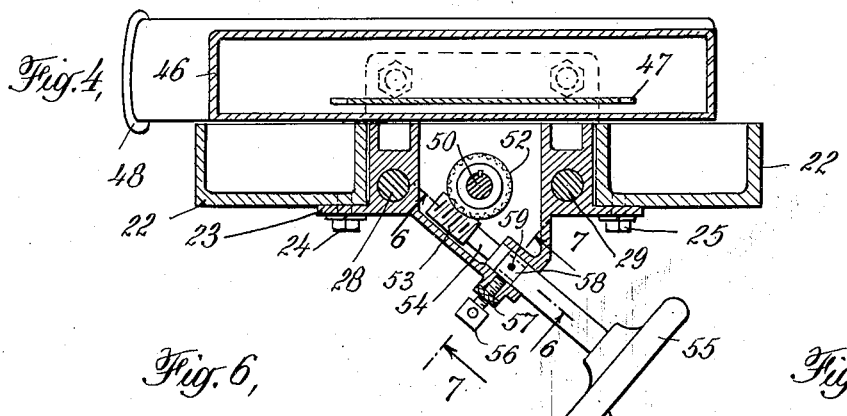
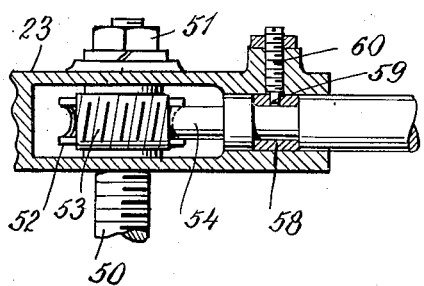
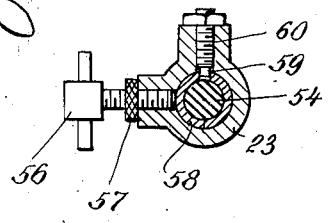
INVENTOR
William F. Ocenasek
BY
ATTORNEYS Patented July 23, 1935

2,008,673

UNITED STATES PATENT OFFICE 2,008,673

POWER-DRIVEN TOOL

William F. Ocenasek, Plainfield, N. J., assignor to Walker-Turner Company, Inc., Plainfield, N. J., a corporation of New York Application March 7, 1934, Serial No. 714,423

5 Claims. (Cl. 143—35)

This invention relates to power-driven tools and particularly to devices facilitating the adjustment of such tools and the mounting thereof in tables and similar supports. The invention is applicable particularly to circular saws and may be applied to such saws when assembled with various forms of tables or supports. The structure includes a unit which may be employed to adjust a saw or similar device vertically with respect to its support. The unit may be assembled with tools of various types to facilitate adjustment thereof.

Bench saws of the circular type are often provided with tables having frames which may be mounted upon any suitable supports. In the present instance, the mechanism is illustrated more particularly with reference to a saw unit which may be mounted in any ordinary table and suspended therefrom. By means of adjusting devices the saw may be raised and lowered to and from working position and caused to project above the table a sufficient distance to permit working on the materials of various thicknesses.

Among the objects of the invention is to provide mechanism for adjusting the saw or other tool vertically without interfering with other parts of the mechanism and with assurance that the tool will be held rigidly in the desired position.

Another object of the invention is the provision of an adjustable arbor which permits the arbor and bearings therefor to be moved longitudinally for the purpose of maintaining the saw or other tool supported on the arbor in the desired position.

A further object of the invention is the provision of means for tilting the mechanism, including the arbor and the saw or other tool carried thereby, to enable it to work at various angular positions.

Another object of the invention is the provision of means permitting the adjustment of the mechanism with respect to a table or other support, so that the work may move smoothly toward and from the saw or other tool.

Another object of the invention is the provision of a readily removable table section having a slot or other opening for the saw or similar tool.

Other objects and advantages of the invention will be apparent as it is better understood by reference to the following specification and the accompanying drawings, in which Fig. 1 is an elevation partially in section illustrating the mechanism supported in a bench or table;

Fig. 2 is a side elevation of the structure illustrated in Fig. 1;

Fig. 3 is a plan view of a portion of the bench or table showing the mechanism supported therein;

Fig. 4 is an enlarged sectional view through the adjusting mechanism;

Fig. 5 is an enlarged section on the line 5—5 of Fig. 1;

Fig. 6 is an enlarged sectional view on the line 6—6 of Fig. 4;

Fig. 7 is an enlarged sectional view on the line 7—7 of Fig. 4;

Fig. 8 is a sectional view on the line 8—8 of Fig. 2; and

Fig. 9 is a sectional view on the line 9—9 of Fig. 3.

Referring to the drawings, 5 indicates a bench or table adapted to support the mechanism. A vertical guide 6 is movable over the surface of the table 5 to direct the work. The means for moving the guide 6 forms no part of the present invention, and is not, therefore, illustrated.

Brackets 7 are secured by lag screws 8 to the table 5 and support a plate 9 by means of screws 10 (Fig. 8) which threadedly engage the plate 9 and set screws 11 having lock nuts which bear against the under surface of the plate. By means of the screws 10 and 11, the plate 9 may be adjusted vertically with respect to the table 5 so that the upper surface thereof is in the same plane with the top of the table 5.

The plate 9 is recessed and provided with a projecting edge 13 to receive a removable plate 14 having a slot 15 (Fig. 3). Lugs 16 extend from the under surface of the plate 14 and are slotted at 17 to engage screws 18 projecting downwardly from the under surface of the plate 9. Wing nuts 19 and washers 20 on the screws 18 permit the clamping of the lugs 16 and thus hold the plate 14 in the desired position. The plate 14 may, however, be removed readily by simply loosening the wing nuts 19 and withdrawing the lugs 16 from the screws 18.

The mechanism so far described is useful more particularly in connection with units designed to be mounted in tables or benches. It may or may not be employed in connection with the mechanism hereinafter described, which is intended to permit the adjustment of the tool both vertically and angularly with respect to the table.

The plate 9 is provided with pins 21 from which brackets 22 are suspended so as to permit angular movement with respect to the table. A crosspiece 23 is secured by bolts 24 and 25 to the brackets 22 and is provided with guideways 26 and 27 for vertically disposed rods 28 and 29. The rods are connected at their upper ends by a crosspiece 30 which includes a housing 31 for the bearing of an arbor 32. At their lower ends the rods 28 are connected by a frame 33.

Conveniently the frame may be provided with a support 34 hinged thereto at 35 to which a motor 36 may be secured by bolts 37. A bolt 38 may extend through a lug 39 on the frame 33, and lock nuts 40 and 41 may be provided to permit adjustment of the support 34 whereby the distance of the motor shaft 42 from the arbor 32 is adjusted to maintain proper tension in a belt 43 which connects a pulley 44 on the motor shaft with a pulley 45 on the arbor.

Supported also on the frame 33 is a housing 46 which is adapted to enclose the lower edge of the saw 47. An outlet 48 from the housing permits withdrawal of sawdust from the mechanism. A hose 49 may be connected to the outlet and to suction means (not shown) for that purpose.

To permit vertical adjustment of the frame 33 and the arbor 32, a screw 50 is threadedly mounted in the frame and projects upwardly through the crosspiece 26. A nut 51 is secured to the upper end of the screw and bears upon the crosspiece so that the frame 33 and the mechanism connected thereto are supported on the crosspiece. A worm wheel 52 secured to the screw 50 engages a worm 53 on a shaft 54 which is supported in the crosspiece 26 and is provided with a hand wheel 55 which permits rotation of the worm and consequently of the screw 50. Thus, by turning the hand wheel, the frame 33 and the arbor 32 may be raised and lowered with respect to the brackets 22. The saw 47 mounted on the arbor 32 is thereby raised or lowered as may be desired.

To permit clamping of the mechanism so that it may be maintained in any desired position, a set screw 56 having a lock nut 57 is mounted on the crosspiece 26. The inner end of the set screw 56 bears upon a sleeve 58 (Figs. 6 and 7) which is mounted in a recess in the shaft 54. The sleeve 58 is prevented from rotating by engagement with the end 59 of a screw 60 with an opening provided therefor in the sleeve 58. Thus, as the shaft 54 rotates, the sleeve 58 remains stationary. If the set screw 56 is released, the shaft 54 may turn freely, but when the set screw is moved inwardly the shaft is firmly clamped and prevented from rotating, and the vertical adjustment of the arbor 32 is thereby fixed.

To permit angular adjustment of the mechanism, a screw 61 is threadedly supported in one of the brackets 22 and is provided with an operating handle 62 and a flange 63 which is adapted to engage a quadrant 64 supported on the plate 9 and having a slot 65 which is adapted to receive a reduced portion 66 of the screw 61. The mechanism may swing about the pins 21 and may be clamped in any desired position, as indicated by a gauge 67 and a pointer 68, by simply turning the screw 61. To facilitate such movement, a counterweight 69 may be connected by a flexible member 70 to the frame 33. The flexible member passes over a pulley 71. Thus, as the mechanism is swung to any position the counterweight 69 is raised or lowered, and the operator is relieved of the necessity of lifting the mechanism. The counterweight may, of course, be omitted, if desired.

To facilitate adjustment of the arbor 32, the ball bearings 72 which support the arbor in the housing 31 are separated by a spacing sleeve 73, and collars 74 and 75 are provided with set screws 76 and 77 to hold the bearings in assembled relation. The collars are of less diameter than the bearings and can, therefore, move into and out of the housing 31. A screw 78 is provided with an end 79 projecting into an opening provided in the housing 73 and is movable in a slot 80 in the housing 31. A washer 81 and nut 82 permit the screw to be locked in any desirable position in the slot 80. Thus, by loosening the nut 82, the sleeve 73, the bearings 72 and the arbor 32 may be moved bodily lengthwise of the housing 31, and the saw 47, which is secured to a reduced extension of the arbor by a washer 83 and nut 84, may be adjusted relatively to the slot 15 in the plate 14. If necessary, the pulley 45 on the arbor 32 may be adjusted thereon to bring it into proper alignment with the pulley 44 on the motor shaft 42.

From the foregoing description, it will be evident that I have provided simple and effective means for accomplishing various adjustments of the mechanism in order that the tool may be supported in the position desired to accomplish the work in hand. The vertical adjustment of the arbor 32 is accomplished by a simple and effective mechanism which may be utilized either with or without the several features herein described. Thus, the unit comprising the brackets 22, the crosspiece 26 and the mechanism for vertically adjusting the arbor with respect to the brackets may be employed in bench saws and similar devices which are assembled with other means for tilting the table and for effecting other and similar adjustments. The mechanism for accomplishing the vertical adjustment is simple, but it is nevertheless rigid, maintains the proper alignment, retains that alignment when locked in any desired position, but is nevertheless readily readjusted as occasion may require.

The removable plate 14 is particularly useful in that interchangeable plates with slots of different lengths and widths may be substituted readily to accommodate saws of different sizes. Thus in dado operations several saws are assembled so that a wider slot is needed, and such saws are usually of smaller diameter, so that the slot may be shorter. The changing of plates to meet the requirements of particular operations is facilitated by the ease with which the plate is removed from and assembled with the table.

Other features of the mechanism as described may be utilized separately or in the combination indicated.

Various changes may be made in the form, construction and arrangement of the parts without departing from the invention or sacrificing any of the advantages thereof.

I claim:

1. In an adjustable support for circular saws and the like, a table having a slot therein, guiding means pivotally supported from the table, a frame, means connected to the frame and extending through the guiding means and including a bearing support, a bearing in said bearing support, an arbor extending through said bearing, a circular saw on said arbor and extending through the slot in the table, means for adjusting the bearing relative to the bearing support to center the saw in said slot, screw means connecting the guiding means and frame, and means for actuating the screw means to raise and lower the frame.

2. An adjustable support for circular saws and the like comprising a table, an adjustable frame comprising an upper member, a lower member and at least one vertically-extending member connecting said upper and lower members, guiding means pivotally supported from the table and having a portion thereof positioned between the upper and lower members through which said vertically-extending frame member is adjustable, a bearing for a saw arbor carried by the upper member of the frame, screw means connecting the guiding means and frame, and means for actuating the screw means to raise and lower the frame in the guiding means.

3. An adjustable support for circular saws and the like comprising a table, an adjustable frame comprising an upper member, a lower member and at least one vertically-extending member connecting said upper and lower members, guiding means pivotally supported from the table and having a portion thereof positioned between the upper and lower members through which said vertically-extending frame member is adjustable, a bearing for a saw arbor carried by the upper member of the frame, a saw arbor rotatably mounted in said bearing, driving means carried by the lower frame member, means for driving said saw arbor from said driving means, screw means connecting the guiding means and frame, and means for actuating the screw means to raise and lower the frame in the guiding means.

4. An adjustable support for circular saws and the like comprising a table, an adjustable frame comprising an upper member, a lower member and at least one vertically-extending member connecting said upper and lower members, guiding means pivotally supported from the table and having a portion thereof positioned between the upper and lower members through which said vertically-extending frame member is adjustable, a bearing for a saw arbor carried by the upper member of the frame, screw means connecting the guiding means and frame, means for actuating the screw means to raise and lower the frame in the guiding means, including gearing and a shaft, and means for actuating the shaft.

5. An adjustable support for circular saws and the like comprising a table, an adjustable frame comprising an upper member, a lower member and at least one vertically-extending member connecting said upper and lower members, guiding means pivotally supported from the table and having a portion thereof positioned between the upper and lower members through which said vertically-extending frame member is adjustable, a bearing for a saw arbor carried by the upper member of the frame, screw means connecting the guiding means and frame, means for actuating the screw means to raise and lower the frame in the guiding means, and means for adjusting the angular position of the pivoted guiding means.

WILLIAM F. OCENASEK.